United States Patent [19]

Oda

[11] Patent Number: 4,973,913
[45] Date of Patent: Nov. 27, 1990

[54] RADIATION MEASURING APPARATUS

[75] Inventor: Minoru Oda, Hyogo, Japan

[73] Assignee: Mitsubishi Denki Kabushiki Kaisha, Tokyo, Japan

[21] Appl. No.: 476,903

[22] Filed: Feb. 8, 1990

[51] Int. Cl.[5] .......................... G01T 1/22; H03K 5/24
[52] U.S. Cl. ............................... 328/117; 250/370.07; 250/369; 307/360
[58] Field of Search ...................... 307/355, 360, 361; 328/117; 250/369, 370.07, 388

[56] References Cited

U.S. PATENT DOCUMENTS

| | | | |
|---|---|---|---|
| 3,366,791 | 1/1968 | Markow | 250/388 |
| 3,942,011 | 3/1976 | Stout | 250/369 |
| 3,960,610 | 2/1976 | Dennis et al. | 250/369 |
| 4,045,743 | 8/1977 | Walker | 307/360 |
| 4,104,593 | 8/1978 | Orii | 307/360 |
| 4,186,307 | 1/1980 | Tanaka et al. | 250/369 |
| 4,193,028 | 3/1980 | Downs, II | 307/360 |
| 4,318,012 | 3/1982 | Minakuchi | 307/360 |
| 4,611,117 | 9/1986 | Seibert et al. | 250/369 |
| 4,751,390 | 6/1988 | Kopp | 250/370.07 |

FOREIGN PATENT DOCUMENTS 1134291  4/1989  Japan .

*Primary Examiner*—Stanley D. Miller
*Assistant Examiner*—Hanh Nguyen
*Attorney, Agent, or Firm*—Bernard, Rothwell & Brown

[57] ABSTRACT

A radiation measuring apparatus capable of producing pulses whose number depends on measured radiation energy and in which the number of pulse height discriminators outputting the pulses is determined by pulse heights or the pulses. The invention makes it possible to compensate sensitivity characteristics of the apparatus against the radiation energy by weighing the number of pulses according to the radiation energy.

1 Claim, 2 Drawing Sheets

RADIATION MEASURING APPARATUS

BACKGROUND OF THE INVENTION

1. Field of the Invention

This invention relates to a radiation measuring apparatus, particularly, one suitable to be utilized in a dose rate meter.

2. Prior Art

FIG. 1 is a block diagram showing a radiation measuring apparatus as a conventional dose rate meter. In FIG. 1, reference numeral 1 is a radiation detector for outputting a pulse signal whose pulse height corresponds to radiation energy detected by the radiation detector 1 such as a scintillation counter or a semiconductor radiation counter; 2, a pulse amplifier which amplifies the pulse signal output from the radiation detector 1; 3, a pulse height discriminator which compares the pulse height of the pulse signal amplified by the pulse amplifier 2 with a predetermined discrimination voltage; 4, a pulse count rate meter which is supplied with a pulse signal discriminated by the pulse height discriminator 3; and 5, an indicator which indicates an output voltage of the pulse count rate meter 4.

Next, the operation will be described. The radiation detector 1 detects radiation and generates a pulse signal, and the pulse amplifier 2 amplifies the pulse signal. The pulse height discriminator 3 responds to pulses among the pulse signal whose pulse height is larger than a predetermined discrimination voltage preset thereto upon receiving the pulse signal from the pulse amplifier 2 and generates output pulses. The pulse count rate meter 4 generates an output voltage (or current) signal proportional to the counting rate (frequency) of the output pulses from the pulse height discriminator 3. The indicator 5 indicates the output voltage (or current) signal from the pulse count rate meter 4. Since the counting rate of the pulse signal is proportional to a dose rate of the radiation incident on the radiation detector 1, the dose rate can be measured by calibrating readings of the indicator 5 with respect to dose rates. Incidentally, the pulse height discriminator 3 is employed for discriminating a pulse signal due to the radiation from other noise pulses. Also, the radiation which the radiation measuring apparatus as a dose rate meter regards as a measuring object is X- or gamma-radiation.

Since a conventional radiation measuring apparatus is constituted as described above, there is a problem that sensitivity to dose rate is different, depending on radiation energy. In particular, in the case where the radiation detector 1 is a scintillation counter or a semiconductor radiation counter, the sensitivity becomes higher at a range of lower radiation energy as shown by a sensitivity characteristic curve against radiation energy in FIG. 2. As a countermeasure for this, there is adopted a method in which the radiation detector 1 is covered with a radiation absorbing filter so as to reduce the sensitivity at the range of lower radiation energy. But, this method poses another problem that the lower limit of the span of measurable radiation energy is narrowed.

SUMMARY OF THE INVENTION

This invention is directed toward eliminating the problems described above, and it is an object of this invention to obtain a radiation measuring apparatus capable of compensating the above-mentioned uneven sensitivity against the radiation energy, which has caused difficulty in the prior art, without sacrificing the range of measurable radiation energy.

The radiation measuring apparatus according to this invention is provided with a plurality of pulse height discriminators with different discrimination voltages in parallel, and both a frequency divider and a delay circuit are connected in cascade to each of the pulse height discriminators except one.

Other features and advantages of the present invention will become apparent by the following detailed description with reference to accompanying drawings.

DETAILED DESCRIPTION OF THE PREFERRED EMBODIMENT

Figure 1:
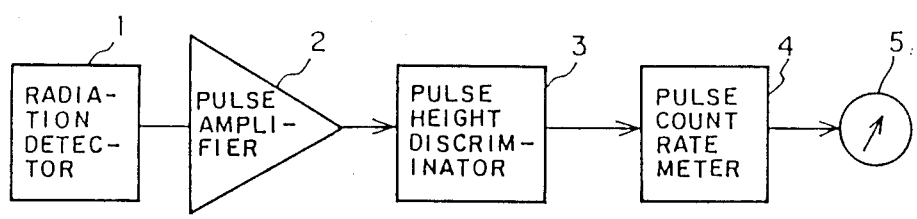
FIG. 1 is a block diagram showing a conventional radiation measuring apparatus.
Figure 3:
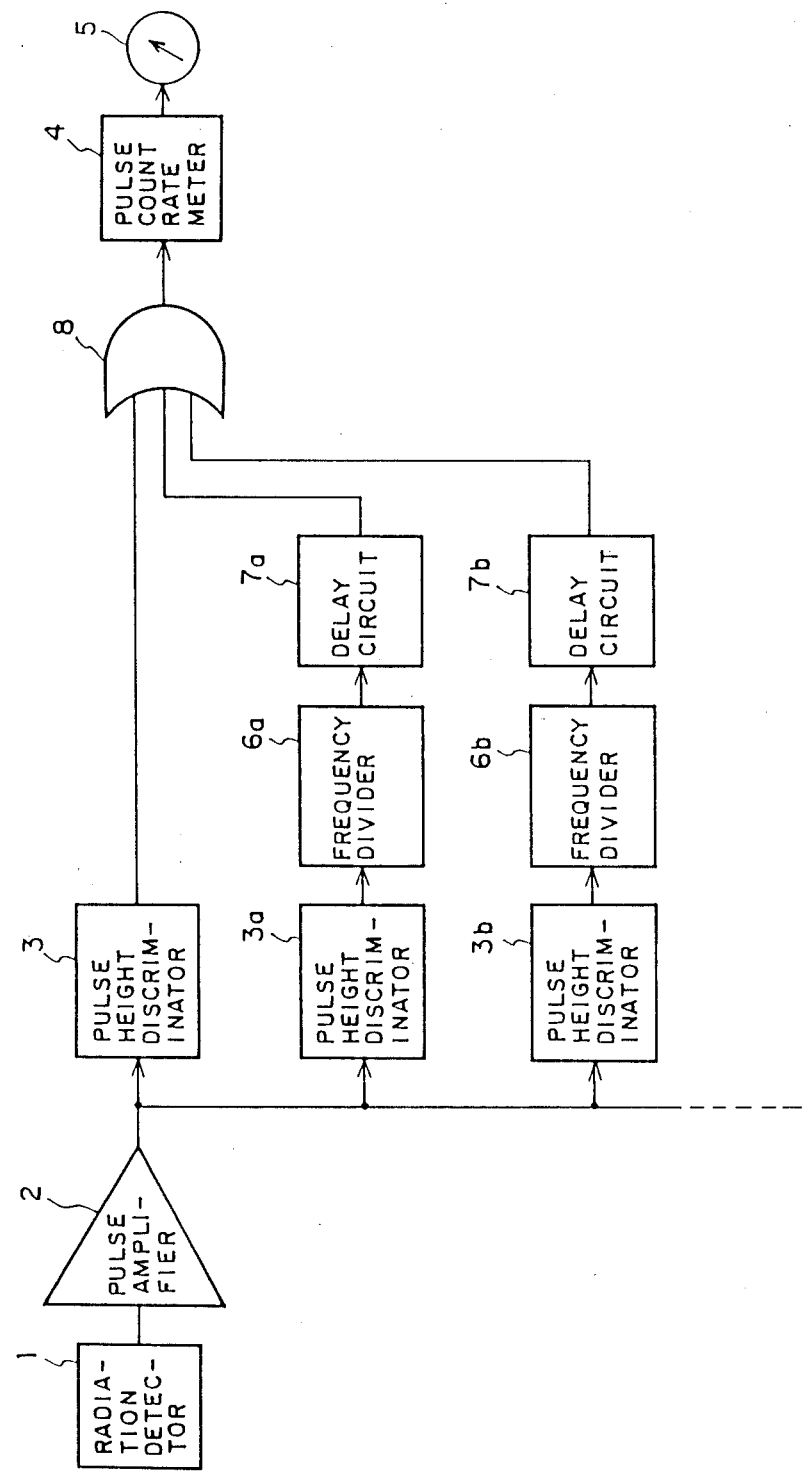
FIG. 3 is a block diagram showing a radiation measuring apparatus according to an embodiment of this invention.

Hereinafter an embodiment of this invention will be described with reference to the drawings. In FIG. 3, parts corresponding to those in FIG. 1 are identified by the same numerals or symbols and the further description of them is omitted. Reference numerals $3a$, $3b$, ... are pulse height discriminators which are connected in parallel with the pulse height discriminator 3 and supplied with a pulse signal via the pulse amplifier 2 from the radiation detector 1. Discrimination voltages $V_3$, $V_{3a}$, $V_{3b}$, ... ($V_3 < V_{3a} < V_{3b} < ...$) are set to these pulse height discriminators 3, $3a$, $3b$, ..., respectively. Reference numerals $6a$, $6b$, ... are frequency dividers which are connected in cascade to the pulse height discriminators $3a$, $3b$, ..., and have frequency dividing ratios $1/N_{6a}$, $1/N_{6b}$, ... respectively. Reference numerals $7a$, $7b$, ... are delay circuits which are connected in cascade to the frequency dividers $6a$, $6b$, ..., and provide predetermined delay times, respectively. Reference numeral 8 is an OR circuit into which output pulse signals from the pulse height discriminator 3 and from the delay circuits $7a$, $7b$, are input.

Next, the operation will be described.

The radiation detector 1 detects radiation and generates a pulse signal, and the pulse amplifier 2 amplifies the pulse signal. Though pulse heights of individual pulses of the pulse signal are different even if the radiation energy is constant, an upper limit of the distribution of pulse heights is substantially proportional to the radiation energy. The pulse signal is provided in parallel to the plurality of pulse height discriminators 3, $3a$, $3b$, ... having different discrimination voltages as described above. The discrimination voltages of the pulse height discriminators 3, $3a$, $3b$, ... are set to $V_3$, $V_{3a}$, $V_{3b}$, ... respectively in ascending order of values like $V_3 < V_{3a} < V_{3b}$ .... As a result, an input pulse having the larger pulse height can make the greater number of pulse height discriminators respond thereto. For instance, an input pulse having its pulse height between $V_3$ and $V_{3a}$ makes only the pulse height discriminator 3 respond thereto. But, an input pulse having its pulse height larger than the value $V_{3a}$, that is, between $V_{3a}$ and $V_{3b}$ can make the two pulse height discriminators 3 and $3a$ respond thereto.

In the latter case, an output pulse signal of the pulse height discriminator 3 is immediately provided to the OR circuit 8, while an output pulse signal of the pulse height discriminator 3a is provided via the frequency divider 6a and the delay circuit 7a to the OR circuit 8. When the frequency dividing ratio of the frequency divider 6a is assumed to be $1/N_{6a}$, the frequency divider 6a outputs one pulse as an output pulse signal for each time when the pulse height discriminator 3 outputs $N_{6a}$ pulses as an output pulse signal. Whenever the frequency divider 6a outputs one pulse, the pulse height discriminator 3 coincidentally outputs one pulse. Since the output pulse from the frequency divider 6a is delayed by the delay circuit 7a and provided to the OR circuit 8 behind the output pulse from the pulse height discriminator 3, both output pulses from the pulse height discriminator 3 and from the frequency divider 6a can be separately counted by the pulse count rate meter 4.

As clarified from the above-mentioned description, a pulse with a pulse height capable of making both the pulse height discriminators 3 and 3a respond thereto is counted at a rate larger than that of a pulse with a pulse height capable of making only the pulse height discriminator 3 respond thereto by a coefficient of $(1+1/N_{6a})$. In the case where the pulse height is further large enough to make the pulse height discriminator 3b respond thereto, the coefficient of the above-mentioned case increases to $(1+1/N_{6a}+1/N_{6b})$. Since each delay time interval of the delay circuits 7a, 7b, ... is set to different values respectively, a pulse via different paths reaches the OR circuit 8 at different times and is counted as separate pulses by the pulse count rate meter 4. As apparent from the above-mentioned description, in the circuit shown in FIG. 3, a pulse having a large pulse height is largely weighted, allowing a larger count to be provided. The pulse having the larger pulse height is counted to a larger count at the rate of 1, $(1+1/N_{6a})$, $(1+1/N_{6a}+1/N_{6b})$ ... for each time when the pulse height exceeds the discrimination voltages $V_3$, $V_{3a}$, $V_{3b}$, ... of the pulse height discriminators 3, 3a, 3b, .... Accordingly, a larger count output can be obtained for a higher radiation energy which produces a pulse having a larger pulse height.

Figure 2:
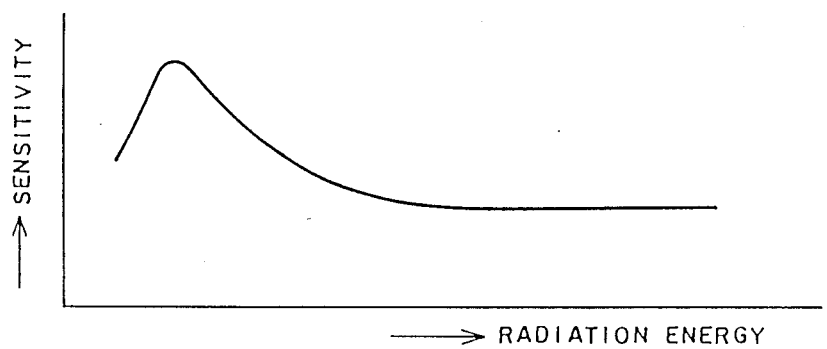
FIG. 2 is a diagram showing sensitivity characteristics against radiation energy of the apparatus shown in FIG. 1.
Figure 4:
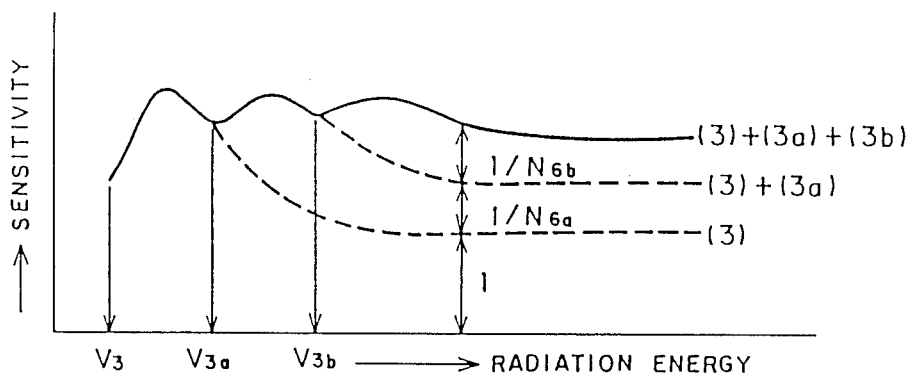
FIG. 4 is a diagram showing sensitivity characteristics against radiation energy in the apparatus shown in FIG. 3.

FIG. 4 shows that sensitivity characteristics of a dose rate meter against radiation energy can be improved and levelled by employing the above-mentioned circuit shown in FIG. 3. When the radiation energy is low, the output pulses from only the pulse height discriminator 3 in FIG. 3 is counted. When the radiation energy becomes higher, count values of the output pulse signals of the pulse height discriminators 3a, 3b, ... are added thereto, so that an overall characteristic curve can be levelled as drawn with a solid line. As shown in FIG. 4, the radiation energy above which the addition of the count occurs can be adjusted by the values of the discrimination voltages $V_3$, $V_{3a}$, $V_{3b}$, ... of the pulse height discriminators 3, 3a, 3b, ...., and the rate of the addition of the count can be adjusted by the frequency dividing ratios $1/N_{6a}$, $1/N_{6b}$, ... of the frequency dividers 6a, 6b, .... Accordingly, the low sensitivity at the range of high radiation energy in the conventional dose rate meter shown in FIG. 2 can be compensated at arbitrary radiation energy by an arbitrary coefficient of compensation. In the above case, as contrasted with a radiation absorbing filter which has been employed to compensate the sensitivity characteristics of a conventional dose rate meter against energy radiation, the reduction of the range of measurable radiation energy at the low energy end does not occur.

Incidentally, in the embodiment described above, the delay circuits 7a, 7b, ... are connected to the output sides of the frequency dividers 6a, 6b, .... But, also, only one delay circuit which is connected to the output side of the pulse height discriminator 3 in place of these delay circuits 7a, 7b, ... achieves the same effect in case of the sum of the dividing ratios being sufficiently less than one, because the frequency dividers 6a, 6b, ... have few chances of generating output pulses simultaneously.

The compensation of sensitivity characteristics against the radiation energy as shown in FIG. 4 is used to level the characteristic curve. Without being limited by this, a characteristic curve having any other selected specific energy dependence characteristic can be obtained by changing the discrimination voltages of the pulse height discriminators and by modifying the connections of the frequency dividers and the delay circuits in many ways.

As described above, since this invention adopts a constitution in which a plurality of pulse height discriminators having different discrimination voltages are provided in parallel, and at the same time, both a frequency divider and a delay circuit are connected in cascade to each of the pulse height discriminators except one, low sensitivity at a range of high radiation energy in a conventional dose rate meter can be corrected by an arbitrary correction coefficient. Also, this invention permits a radiation measuring apparatus for a dose rate meter having high practical value to be obtained because reduction of the range of measurable radiation energy at the low energy end does not occur, in contrast with the conventional correction method using a radiation absorbing filter.

What is claimed is:

1. A radiation measuring apparatus comprising:

m(m is an integer not less than 2 in number) pulse height discriminators, each of which is provided with respective different predetermined discrimination voltages and connected in parallel with an input signal of pulses with pulse heights corresponding to detected radiation energy so as to discriminate the pulse heights of said input signal and to output discriminated pulse signals, respectively;

(m−1) frequency dividers, each of which is provided with respective predetermined frequency dividing ratios and connected in cascade with said respective pulse height discriminators except a first pulse height discriminator so as to divide the discriminated pulse signals output from the respective pulse height discriminators by said respective frequency dividing ratios and to output submultiple pulse signals, respectively;

(m−1) delay circuits, each of which is provided with respective different predetermined delay times and connected in cascade with said respective frequency dividers so as to delay the submultiple pulse signals output from the respective frequency dividers by said predetermined delay times and to output sensitivity compensating pulse signals, respectively; and an OR circuit which is supplied with the discriminated pulse signal output from said first pulse height discriminator and the sensitivity compensating pulse signals output from said respective delay circuits so as to output a logical sum signal of these pulse signals as an output pulse signal.

* * * * *